(12) United States Patent
Bettis et al.

(10) Patent No.: US 8,040,880 B2
(45) Date of Patent: Oct. 18, 2011

(54) SIGNED MESSAGE BASED APPLICATION GENERATION AND DELIVERY

(75) Inventors: Sonny R. Bettis, Lawrenceville, GA (US); Ian M. Moraes, Suwanee, GA (US); Mark A. Yaphe, Suwanee, GA (US)

(73) Assignee: Movius Interactive Corporation, Johns Creek, GA (US)

(*) Notice: Subject to any disclaimer, the term of this patent is extended or adjusted under 35 U.S.C. 154(b) by 591 days.

(21) Appl. No.: 11/352,443

(22) Filed: Feb. 10, 2006

(65) Prior Publication Data
US 2007/0025340 A1    Feb. 1, 2007

Related U.S. Application Data

(63) Continuation-in-part of application No. 11/170,530, filed on Jun. 29, 2005, now Pat. No. 7,701,929.

(60) Provisional application No. 60/596,752, filed on Oct. 18, 2005, provisional application No. 60/584,117, filed on Jun. 30, 2004, provisional application No. 60/584,070, filed on Jun. 30, 2004, provisional application No. 60/584,445, filed on Jun. 30, 2004, provisional application No. 60/584,444, filed on Jun. 30, 2004, provisional application No. 60/584,270, filed on Jun. 30, 2004, provisional application No. 60/584,067, filed on Jun. 30, 2004, provisional application No. 60/584,394, filed on Jun. 30, 2004, provisional application No. 60/584,058, filed on Jun. 30, 2004, provisional application No. 60/584,079, filed on Jun. 30, 2004, provisional application No. 60/584,312, filed on Jun. 30, 2004, provisional application No. 60/584,393, filed on Jun. 30, 2004, provisional application No. 60/584,310, filed on Jun. 30, 2004, provisional application No. 60/584,046, filed on Jun. 30, 2004, provisional application No. 60/584,114, filed on Jun. 30, 2004, provisional application No. 60/584,311, filed on Jun. 30, 2004, provisional application No. 60/584,430, filed on Jun. 30, 2004, provisional application No. 60/584,068, filed on Jun. 30, 2004, provisional application No. 60/584,313, filed on Jun. 30, 2004.

(51) Int. Cl.
*H04L 12/66* (2006.01)

(52) U.S. Cl. ........ 370/356; 370/389; 370/474; 709/206; 717/177

(58) Field of Classification Search .................. 370/241, 370/252, 351, 352, 356, 389, 400, 401; 379/67.1, 379/88.17, 900; 709/204, 205, 206, 207, 709/217, 218, 219, 246, 247
See application file for complete search history.

(56) References Cited

U.S. PATENT DOCUMENTS

| | | | | |
|---|---|---|---|---|
| 6,148,329 A | * | 11/2000 | Meyer | 709/206 |
| 6,546,417 B1 | * | 4/2003 | Baker | 709/206 |
| 7,023,970 B1 | * | 4/2006 | Sealey et al. | 379/88.17 |
| 2001/0048676 A1 | * | 12/2001 | Jimenez et al. | 370/352 |
| 2002/0111989 A1 | * | 8/2002 | Ambler et al. | 709/202 |

(Continued)

*Primary Examiner* — Seema S. Rao
*Assistant Examiner* — Khoa Huynh
(74) *Attorney, Agent, or Firm* — Smith Risley Tempel Santos LLC; Gregory Scott Smith; Matthew T Hoots (57) ABSTRACT

A mailbox system that has a distributed architecture is disclosed. The system includes an application server, a media server, and message storage system having subscriber mailboxes. Application messages may be stored in a subscriber's mailbox. When the subscriber accesses an application message, the application server uses the application message to create an application, which is then provided to the media server. The media server then executes the application for the subscriber.

7 Claims, 4 Drawing Sheets

SIGNED MESSAGE BASED APPLICATION GENERATION AND DELIVERY

CROSS-REFERENCE TO RELATED APPLICATION

This patent application is a U.S. non-provisional application filed pursuant to Title 35, United States Code §100 et seq. and 37 C.F.R. Section 1.53(b) claiming priority under Title 35, United States Code §119(e) to U.S. provisional application No. 60/596,752 filed Oct. 18, 2005 entitled "APPLICATION MESSAGE," which application is herein incorporated by reference, and this patent application is a continuation in part of U.S. non-provisional application Ser. No. 11/170,530 filed Jun. 29, 2005 now U.S. Pat. No. 7,701,929, entitled "DISTRIBUTED TELECOMMUNICATIONS ARCHITECTURE PROVIDING REDUNDANT GATEWAYS AND IP DEVICE INTEGRATION," which is hereby incorporated by reference in its entirety and which claimed the benefit of the filing dates of the following U.S. Provisional Applications, all of which are hereby incorporated by reference in their entirety:

Ser. No. 60/584,117 entitled DISTRIBUTED IP ARCHITECTURE FOR TELECOMMUNICATIONS SYSTEM, filed on Jun. 30, 2004;

Ser. No. 60/584,070 entitled AUTO BLOCK AND AUTO DISCOVERY FUNCTIONS, filed on Jun. 30, 2004;

Ser. No. 60/584,445 entitled IMPROVED COMPONENT PERFORMANCE USING DMA DATA TRANSFERS, filed on Jun. 30, 2004;

Ser. No. 60/584,444 entitled VXML BASED TELEPHONE SERVICE SYSTEM, filed on Jun. 30, 2004;

Ser. No. 60/584,270 entitled MESSAGE DURABILITY FOR VOICE MESSAGING SYSTEM, filed on Jun. 30, 2004;

Ser. No. 60/584,067 entitled AUDIO CHUNKING, filed on Jun. 30, 2004;

Ser. No. 60/584,394 entitled DISTRIBUTED TELECOMMUNICATIONS PLATFORM, filed on Jun. 30, 2004;

Ser. No. 60/584,058 entitled MEDIA SERVER, filed on Jun. 30, 2004;

Ser. No. 60/584,079 entitled SIGNALING GATEWAY, filed on Jun. 30, 2004;

Ser. No. 60/584,312 entitled DOCUMENT SERVER, filed on Jun. 30, 2004;

Ser. No. 60/584,393 entitled NEXT GENERATION TELEPHONE PLATFORM, filed on Jun. 30, 2004;

Ser. No. 60/584,310 entitled TS SELECT, filed on Jun. 30, 2004;

Ser. No. 60/584,046 entitled MESSAGE DURABILITY AND RETRIEVAL, filed on Jun. 30, 2004;

Ser. No. 60/584,114 entitled HEALTH MONITOR SUBSYSTEM, filed on Jun. 30, 2004;

Ser. No. 60/584,311 entitled SOFTWARE REQUIREMENTS SPECIFICATION: CDMS CHANGES FOR FRED, filed on Jun. 30, 2004;

Ser. No. 60/584,430 entitled Architecture Infrastructure For The Document Server And Telephony Server of FRED, filed on Jun. 30, 2004;

Ser. No. 60/584,068 entitled Architecture Design Document: Next Generation Message Store Project, filed on Jun. 30, 2004; and Ser. No. 60/584,313 entitled FAX MESSAGE STORING, filed on Jun. 30, 2004; and this application is related to, and incorporates by reference, U.S. patent application Ser. No. 11/080,744 entitled DISTRIBUTED IP ARCHITECTURE FOR TELECOMMUNICATIONS SYSTEM filed on Mar. 15, 2005.

TECHNICAL FIELD

The present invention relates to mailbox systems and, more particularly, to providing a user of a mailbox system with content by executing an application rendered from a message.

BACKGROUND OF THE INVENTION

Today, communication solution providers must rapidly create useful, vendor-agnostic, targeted, standards-compliant, and cost-effective telephony/video and entertainment applications that easily integrate with other enterprise or carrier solutions and leverage existing deployed infrastructure. These solutions can vary from VoiceXML-based voice mail to video-enabled store front applications.

Messaging applications and call completion applications are a key offering of communication service providers. A vast majority of subscribers call into their mailbox to check their messages. This subscriber activity provides a unique and untapped distribution channel for both existing and new products. In terms of a distribution channel, the subscriber is familiar with the store (the mailbox), comes to the store often and receives a personalized and trusted experience. However, currently, there are only a few products in the store such as certain types of messages (voice, video and fax) and certain types of content through a portal.

There exists a need for a communication system having a mailbox with the infrastructure capable of rapidly delivering a plethora of customized and personalized services, or product promotions with possibly short life spans to individual users and groups of users for services without massive deployment procedures and use of permanent platform resources.

SUMMARY OF THE INVENTION

One aspect of the present invention is directed towards a VXML based telecommunications system that allows the operation to be easily customized.

Embodiments of the present invention can also be viewed as methods for providing mailbox service. In this regard, one embodiment of such a method, among others, can be broadly summarized by the following steps: retrieving a message from a message storage system; using the message to generate an application, wherein the application includes a Voice eXtensible Markup Language; and providing content to a user by executing the application.

Embodiments of the present invention can also be viewed as methods, which may be embodied in a computer readable medium, for providing mailbox service. In this regard, one embodiment, among others, can be broadly summarized by computer readable medium comprising: a module for retrieving a message from a message storage system; a module for generating an application by using at least a portion of the message, wherein the application includes a Voice eXtensible Markup Language; and a module for providing content to a user by executing the application.

Other systems, methods, features, and advantages of the present invention will be or become apparent to one with skill in the art upon examination of the following drawings and detailed description. It is intended that all such additional systems, methods, features, and advantages be included

DETAILED DESCRIPTION OF THE INVENTION

The present invention provides a distributed IP architecture, also described as a next-generation communications platform, for telecommunications equipment, such as a PBX, mailbox system, or the like. By utilizing the architecture of the present invention, the various functionalities of the telecommunications equipment can be divided amongst various physical components and the physical components can be geographically dispersed. Each of the components communicates with each other, as needed, through independent interfaces to an IP network. The complexities of interfacing to the telephone network are handled through a single gateway component and a simplified protocol is used for communication between the remaining components of the telecommunications equipment or to the telephone network through the gateway component.

It should be understood that the distribution of functionality illustrated in the figures and described, although having novel aspects in itself, is not the only acceptable arrangement, and aspects of the present invention could be incorporated into a system that includes fewer or more components and a different arrangement of functionality among the components.

As will be explained in detail hereinbelow, in some embodiments, an aspect of the present invention is that a subscriber shall be capable of receiving a personalized service by accessing an application message in his/her mailbox. It should be noted that from a subscriber's perspective, this application message appears to simply be just another message in his or her mailbox. Furthermore, it should be noted that application messages may be sent by an operator of the communication platform, by other subscribers of the communication platform, or by third parties, i.e., parties that do not operate or subscribe to the communication platform. When a subscriber accesses an application message, a voice or video application or other type of application is executed.

Another aspect, in some embodiments, is that an operator shall be capable of limiting the delivery and execution of application messages in the communication platform.

Yet another aspect, in some embodiments, is that an application may be delivered to a subscriber's mailbox using industry standard languages and tools such as, but not limited to, VoiceXML, HTML/XHTML, WML, ECMAScript, JSP, JSTL, JSP Custom Tags.

With the advent of scripting languages such as, but not limited to, VoiceXML, HTML/XHTML, WML, frameworks such as JavaJSP, JSTL and JSP Custom Tags and common industry tools to create applications using these languages, a new application can easily be created and the application artifacts can be sent to another user. The user can then retrieve and assemble the documents and then execute them using an appropriate interpreter (VoiceXML browser, web browser, etc). It is this approach that is used to deliver an application in the form of a message in a subscriber's mailbox.

Among other things, embodiments of the present invention can be used to deliver a targeted application to a subscriber in the form of a message that when accessed executes a specific, personalized, targeted application, which, in some embodiments, may be comprised of standard technologies. This type of targeted application that is delivered in the form of a message is what is known as an application message. Thus, embodiments of the present invention may include the ability to combine "executable Logic" with message content data to form a composite message that can be customized for each user.

Now turning to the drawings, in which like labels refer to like elements throughout the several views, various aspects and features of the present invention are described.

Figure 1:
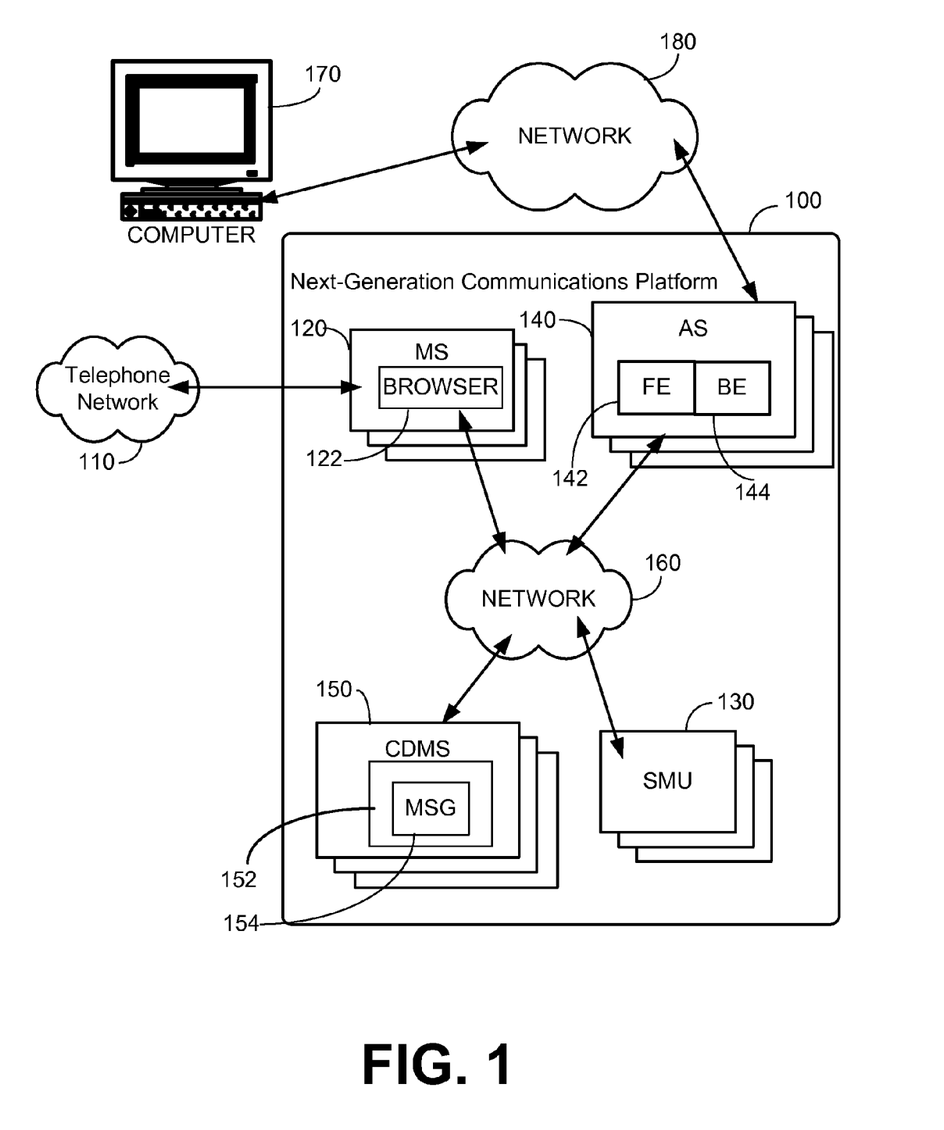
FIG. 1 is a block diagram illustrating an exemplary embodiment of a distributed communication platform in communication with a telephone network.

FIG. 1 is a system diagram illustrating the components and the connectivity of an exemplary next-generation communications platform 100. One aspect of the present invention is a distributed IP-based architecture for telecommunications equipment that, among other things, can provide telecommunication services such as mailbox, call forwarding and other telecommunication features. In the illustrated embodiment, the next-generation communications platform 100 has a distributed IP architecture and is connected to a telephone network 110. The telephone network 110 can be, among others, a wireless telephone network or a Public Switched Telephone Network (PSTN) or Video over Internet Protocol (VoIP) (SIP, H.323) and/or 3G, 324M networks.

The communications platform 100 is illustrated as including one or more media servers (MS) 120, one or more system management units (SMU) 130, one or more application servers (AS) 140 and one or more central data and message store (CDMS) 150, which are connected by a network 160. Typically, the network 160 is an Internet Protocol (IP) network such that communications over the IP network conform to an internet protocol (IP), which are well known in the art.

In some embodiments, a subscriber of the communications platform 100 can receive an email and the communication platform can notify the user that he or she has received the email. A computer 170 is in communication with the application server 140 via a network 180, which typically is the internet. The computer 170 may be used to send emails to the communications platform 100. The application server may provide emails for a subscriber to the CDMS 140, which then stores the messages in the subscriber's mailbox 152.

Briefly described, the media servers 120 terminate IP from components of the communications platform 100 and/or terminate circuit switched traffic from the telephone network 110. The media servers 120 are also responsible for trunking and call control.

Among other things, the application servers 140 may generate pages conforming to a scripting language such as, but not limited to, VoiceXML, HTML/XHMTL, and WML. In the following discussion, the pages are generally referred to as VoiceXML pages, but this is done for the sake of clarity and the description thereof is a non-limiting embodiment.

Typically, the application servers 140 generate dynamic VoiceXML (VXML) pages for various applications. The application servers 140 provide the VXML pages to the media servers 120, which render the VXML pages or portions of the VXML pages. The applications servers 140 also provide an external interface to the communications platform 100.

The SMU 130 is a management portal that enables service providers to provision and maintain subscriber accounts and manage network elements from a centralized web interface.

The CDMS 150 stores messages, subscriber records, and manages specific application functions including notification. In some embodiments, the messages for a subscriber may include voice messages, video messages, email messages, and application messages, which are frequently sent to the subscriber in an email message. Mailbox 152 is used to store a subscriber's messages.

Each of the components in the next-generation communications platform 100 is independently scalable and independently interconnected onto the network 160. Thus, the components can be geographically distributed but still operate as a single communications platform as long as they can communicate with each other over the network 160. This is a significant advantage of the present invention that is not available in state-of-the-art communication systems. Selected components of the communication platform 100 are described in greater detail hereinbelow.

Media Server (MS)

The MS 120 terminates circuit-switched traffic from the telephone network 110. The MS 120 is responsible for call set up and control within the platform architecture. The MS 120 processes input from the user in either voice, DTMF format or other signaling scheme (much like a web client gathers keyboard and mouse click input from a user). The MS 120 may present content to the user in voice/audio form and/or video form (similar in principle to graphic and text displayed back to the user on a PC client). This client/server methodology enables rapid creation of new applications and quick utilization of content available on the World Wide Web.

The MS 120 processes incoming calls via requests to the AS 140. The requests to the application server are typically done by sending a Uniform Resource Locator (URL) or other internet standard such as HTTP to the application server 140. Among other information provided to the AS 140, the MS 120 normally includes the telephone number of the incoming call, i.e., the telephone number dialed by the caller of the incoming call.

A load balancer (not shown) preferably directs traffic arriving at the MS 120 to one of the plurality of ASs 140. This functionality ensures that traffic is allocated evenly between active servers. The MS 120 may work as a client on behalf of the end-user. As a non-limiting example, in one embodiment, the MS 120 may include a VoiceXML client that works on behalf of the end-user in much the same manner as a client like Netscape works on behalf of an HTML user on a PC. The media servers 120 include a brower such as a VoiceXML browser 122 that renders pages such as VoiceXML pages for presentation to users.

VoiceXML is a standards-based scripting language for developing voice-enabled software applications. This means that developers use and leverage Web-based (HTML) development expertise in developing speech-based telephony applications.

Application Server (AS)

The modular design of the next-generation communications platform 100 has the added advantage that it is easy to deploy enhanced services, such as voice dialing and voice navigation, unified communications solutions, multimedia messaging services, and presence & availability management applications. Adding applications to the platform is accomplished via the addition of standard application servers 140 to the common platform. The application servers 140 have a front end 142 that communicates with, among other things, the media server 120 and a back end 144 that communicates with, among other things, the CDMS 150. The front end 142 normally includes a Telephone User Interface (TUI), and the back end 144 may include a messaging system such as Open-UMS.

Each application server 140 generates application documents such as, but not limited to, VoiceXML pages. Typically, the VXML pages are generated in response to requests from the media server 120. The application server 140 leverages a web application infrastructure to interface with back-end data stores such as CDMS 150 to generate the VXML pages.

The overall web application infrastructure separates the core service logic (i.e., providing the business logic) from the presentation details (VXML) to provide a more extensible application architecture. In one embodiment, the application server 140 utilizes Java 2 Enterprise Edition (J2EE) environment and Java Server Pages (JSP) to create the dynamic pages such as, but not limited to, VXML pages for the media server. Combining these technologies enables rapid incorporation of Speech Application Language Tags (SALT) to provide interoperability (multimodal) between applications like WAP, HTML, XHTML and voice—allowing the end user to simultaneously input data via voice command and receive presentation via WAP or HTML.

To create an environment for easy application development, the application server 140 preferably supports Template+JSPs. Applications are implemented in JSPs using an API for access to messaging functions. These JSPs are readily modifiable making changes in application behavior and creation of new applications very easy.

Common Database and Message Store (CDMS)

The CDMS 150 has sufficient storage capacity such that the communications platform 100 can provide services to multiple subscribers. Among other things, the CDMS 150 includes mailboxes 152 in which messages 154, which include application messages, are stored. Each one of the mailboxes 152 is associated with a subscriber of the communications platform 100. In addition to application messages 154, both voice/audio messages and email messages for a subscriber may be stored in a subscriber's mailbox.

The CDMS 150 is preferably designed with fully redundant components and utilizes reflective memory and Redundant Array of Independent Disks (RAID) technology for fault tolerance, immediate fail over and recovery. This ensures five 9's availability for associated hardware and software components. Essential disk drive and RAID controller components are preferably "hot swappable" eliminating the need to power down the system for replacements. With the CDMS 150, performance is optimized for the unique characteristics of voice messaging, eliminating the performance degrading, unnecessary e-mail-centric database functionality that comes with the searching and sorting of e-mail stores.

The CDMS 150 can utilize standard of the shelf e-mail storage systems. The message store is abstracted through the use of Java middleware that allows the selection of the message store to be transparent to the application, enabling each message type to be stored in the most efficient store possible.

Voice/audio messages are stored on the CDMS 150 when a caller leaves a mailbox message for a subscriber. Voice/audio messages also include voice/audio messages transferred and or forwarded between subscribers. Voice/audio messages can also include the subscriber's "greeting," which can be played to a caller.

System Management Unit (SMU)

The SMU 130 provides a centralized point for service providers to manage all network elements, providing remote access, maintenance, and backup functionality. The SMU 130 provides a single interface for provisioning, alarming, reports, and subscriber migration. The SMU 130 integrates and customizes systems with new elements and applications, and provides operational support and network management functions for carriers experiencing swiftly growing networks and exploding traffic volumes.

Software Architectural

Figure 2:
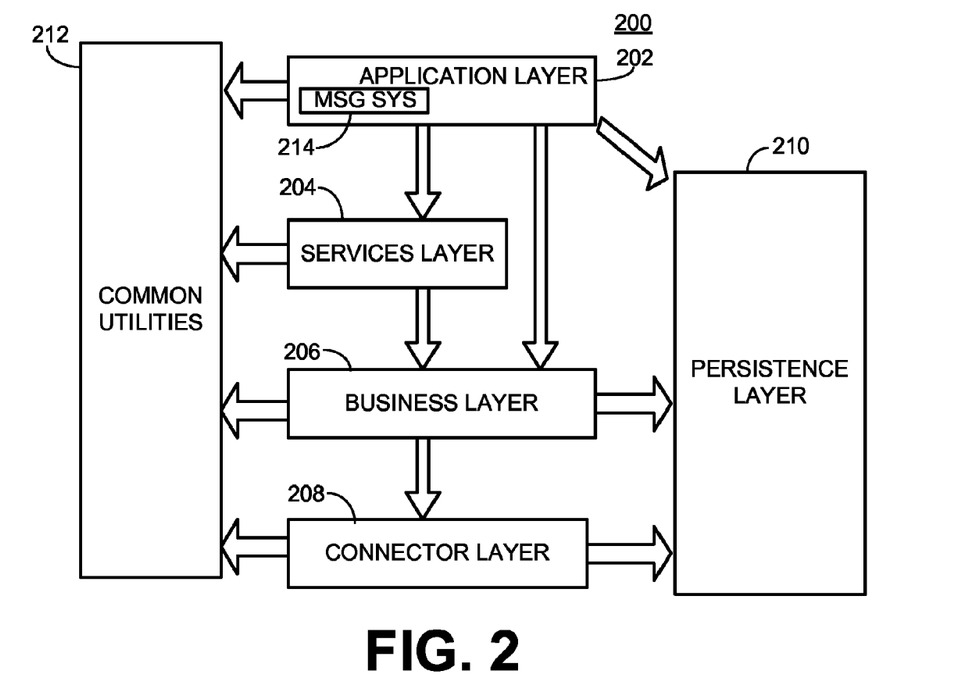
FIG. 2 is block diagram of system architecture.

FIG. 2 illustrates an exemplary embodiment software architecture 200 for the communications platform 100. The software architecture 200 is partitioned into distinct layers of responsibility in order to manage complexity, encapsulate responsibilities and promote reuse. This type of architecture promotes a more extensible and maintainable system. The software architecture can be segmented into six distinct layers: Application Layer 202, Services Layer 204, Business Layer 206, Connector Layer 208, Persistence Layer 210, and Common Utilities 212.

Each architectural layer encapsulates a specific set of responsibilities. In some embodiments, for layers 202, 204, 206, and 208, each architectural layer may depend only on the layers below it. Furthermore, in some embodiments, each architectural layer may include facades to reduce coupling between layers. It is important to note that these architectural layers do not represent layers in a protocol stack.

The application-specific layer 202 manages interactions with users or interfaces with external applications using technologies such as servlets, JavaServer Pages (JSP), JSTL, JSP Custom Tags, Extensible Markup Language (XML), Extensible Stylesheet Language (XSL), HTML, VoiceXML, SMIL, Wireless Markup Language (WML), and XHTML. This layer also represents client-specific logic in the form of a distributed client or local application that would use the services layer 204 or the business layer 206 to satisfy core use cases.

In order to foster rapid development, increase extensibility and promote maintenance, common application layer components are reused by different applications where appropriate. For example, common application layer components include mediators to the business layer, user interface components, and speech objects. In this way, applications with disparate user interfaces can share common application components. Further, common application design patterns (e.g., Model-View-Controller, J2EE) may be used to develop applications at this layer.

Typically, components of the application layer 202 that interface with users and external systems may be built on a messaging system 214 such as, but not limited to, OpenUMS (Open Unified Messaging System). Applications may use OpenUMS or other messaging system to provide the underlying business logic. For the sake of clarity, the messaging system 214 will be described in terms of OpenUMS, but this is intended as a non-limiting example.

OpenUMS includes an OpenUMS API that provides a common and unified application interface for accessing disparate proprietary and standards-based messaging, directory and content servers. OpenUMS provides the business objects that enable different applications to perform functions such as access the common database and message store, manage voice, fax, and email messages and data from different systems (common store, email server, content servers, Profiler). OpenUMS provides the underlying service logic using an open, Java 2 Enterprise Edition (J2EE)-based, object-oriented API to develop applications in a protocol, platform and vendor-independent manner. For example, OpenUMS presents objects to applications such as a message object that has a message sender, message recipient, subject, and date. An OpenUMS message can also comprise other objects such as message attachments. Thus, the application is abstracted from message details such as SMTP, IMAP, POP, and MIME and can focus on its core application logic.

The services layer 204 provides a distributed interface that allows application layer components to satisfy use cases using distributed computing standards such as Common Object Request Broker Architecture (CORBA), Enterprise JavaBeans (EJB) and Web Services (SOAP). The services layer 204 may provide a coarse-grained, service-oriented interface for use by distributed clients. Application elements may allow other applications to access distributed interfaces using HTTP and XML-based protocols such as Simple Object Access Protocol (SOAP).

The business layer 206 it typically an application-independent layer that provides the domain objects, which in some embodiments are "core" domain objects, that model abstractions in domains such as messaging, provisioning, directory services, calendaring, and informational services. Typically, the domain objects are platform, vendor and protocol independent. The business layer 206 may be used by both the application layer 202 and services layer 204 components. The business layer 206 may be implemented in Java and may or may not have a distributed computing interface. The business layer 206 may define a connector layer interface for plugging in disparate message, content, and directory devices. Implementations of the connector layer interface comprise the Connector layer 208. The business layer 206 may provide support for eventing and notification mechanisms where appropriate. The business layer 206 may be supported in OpenUMS.

Typically, the connector layer 208 is a layer between the business layer 206 and a target messaging, directory service, calendar service, or informational service sources (not shown). The connector layer 208 may enable upper layers of the architecture to use the business layer 206 with different underlying messaging, informational service and directory service devices in a uniform and dynamic manner. The connector layer 208 may or may not have a distributed computing interface. The connector layer 208 may be supported in OpenUMS.

Typically, the connector layer 208 may be a lower-level business layer that provides Java implementations of a defined set of classes and interfaces that are specified in the connector layer interface of the business layer 206. This layer defines how issues such as security, resource pooling need to be managed by a connector. This layer is used only by the business layer components and is dependent on the server-specific business logic. It provides the mapping between distinct interfaces-the OpenUMS connector interface and the native, and most likely, proprietary interface of the messaging or content source. The connectors shall use suitable J2EE API's to interface with external systems.

A connector hides the complexities of the native interface from a developer using the business layer. There are two types of connectors: thick and thin connectors. Thin connectors do a binding from the business layer to the native API. Thick connectors provide additional functionality (e.g., load balancing, connection management, security) between the business layer and the native API.

The persistence layer 210 encapsulates the behavior needed to persist objects and subscriber and application data. The persistence layer 210 may be an application-independent layer that encapsulates the behavior needed to persist objects and subscriber and application data. Typically, the business layer or the services layer or the application layer uses the persistence layer 210 in case direct persistence mechanisms are required. In some embodiments, the persistence layer 210 could also provide other types of persistence mechanisms such as object-relational mapping mechanisms and configuration database utilities.

The common utilities layer 212 provides common foundation packages and utilities (e.g., logging, alarming) that should be used by all layers. The common utilities layer 212 may be an application-independent layer that provides common foundation packages and utilities that should be used by all layers. Typically, these components should not depend on another layer of the architecture. Examples include the alarm subsystem (ASU), security, logging, internationalization, statistics, application configuration.

Figure 6:
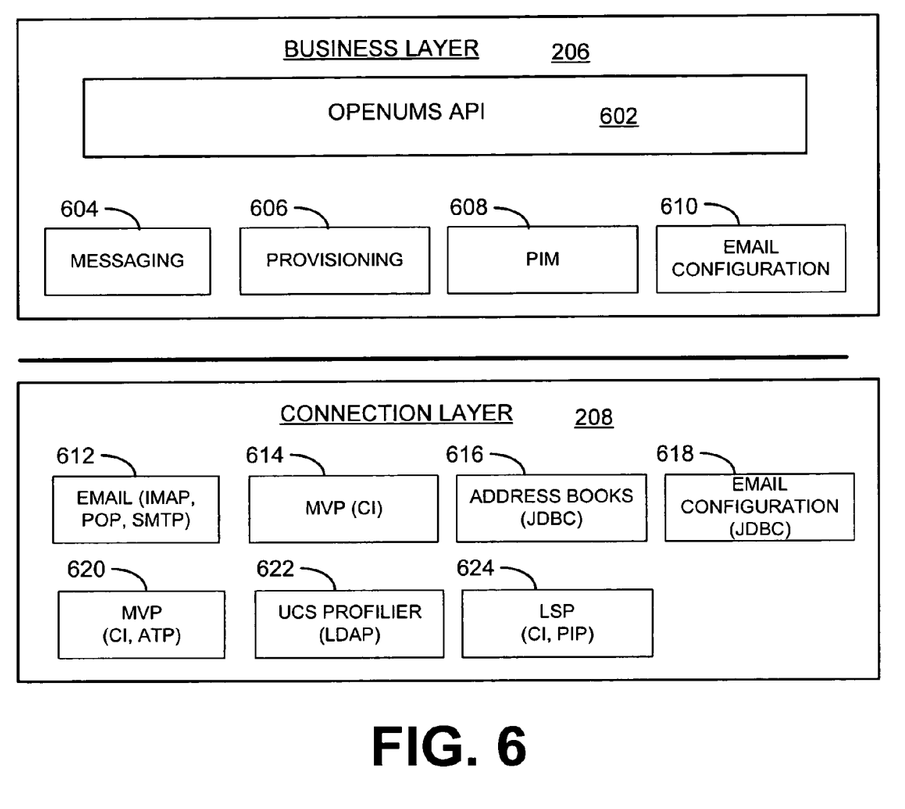
FIG. 6 is a block diagram of selected layers of the system architecture of FIG. 2.

FIG. 6 illustrates one embodiment of selected components in the business layer 206 and the connection layer 208. The business layer 206 includes an OpenUMS API module 602. In addition, the business layer 206 may include components such as, but not limited to, a messaging module 604, a provisioning module 606, a PIM module 608, and an email configuration module 610.

The connector layer 208 may also include components 612, 614, 616, 618, 620, 622, and 624, which may, among other things, connect to components in the business layer 206.

System Architecture

The communications platform 100 may use a standard VoiceXML architecture in which applications on the Application Server 140 generate documents in response to requests from the Media Server 120. The Application Server 140 leverages a web application infrastructure to interface with back-end data stores such as the CDMS 150 to generate VoiceXML documents. The communications platform applications may be designed to support an overall architectural vision of being able to provide an open application development environment to rapidly and effectively deliver feature-rich, customized, and personalized services using industry standard technologies. The web application infrastructure separates service logic (i.e., providing the business logic) from the presentation details (VoiceXML, XHTML, WML) to provide a more extensible application architecture. The application infrastructure may also be responsible for maintaining application dialog state in a form that is separate from a particular presentation language mechanism. The application infrastructure may be shielded from the back-end data store specifics by using abstractions provided by the business layer 206. The CDMS 150 may provide a highly available back-end data store for voice, video, and fax messages as well as subscriber profiles and has a notification engine.

In order to process incoming calls, the Media Server 120 may request documents from the Application Server 140 using a protocol such as, but not limited to, HTTP. The VoiceXML browser 122 that resides on the Media Server 120 interprets the VoiceXML documents to interact with users on telephones such as, but not limited to, 2G and/or 3G phone. The Media Server 120 interfaces with the telephone network 110, which may be a PSTN, VoIP (SIP, H.323) and/or 3G-324M networks. The Media Server 120 may also interface with Application Speech Recognition (ASR) and Text-to- Speech (TTS) servers (not illustrated).

In one embodiment, the communication platform 100 enables a user or subscriber to store application documents and artifacts (prompts, grammars) in the CDMS 150 as a message 154. Typically, the message 154, which may be represented as a Multipurpose Internet Mail Extensions (MIME) multipart, is stored as a binary large object (BLOB) in the CDMS 150. When the application server 140 retrieves the message 154, the message 154 is MIME decoded. After MIME decoding the message may be comprised of artifacts including one or more VoiceXML documents and supporting files, which are deployed on the Application Server 140. The VoiceXML documents and the supporting files are used by a TUI application of the front end 142 to generate a VoiceXML page that is provided to the Media Server 120 for execution. Thus, the Media Server 120 is agnostic to the concept of an application message.

Note that while the embodiments have described an application message 154 in terms of VoiceXML and voice applications, there is nothing to preclude the use of application messages with video or other type of markup languages (e.g., SALT) or applications.

Creation and Deposit of Application Message

Figure 3:
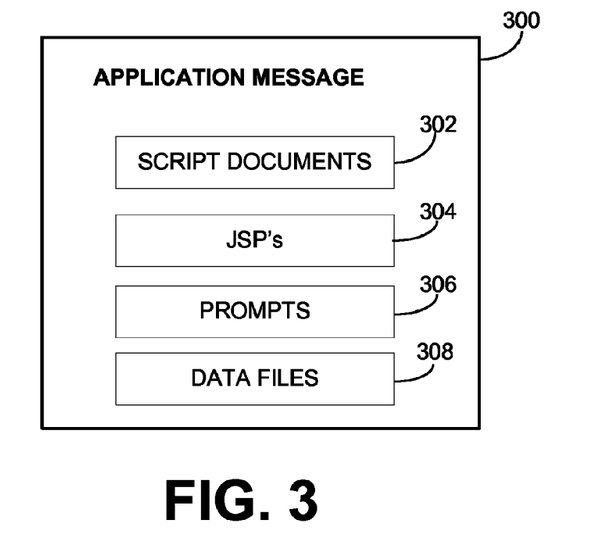
FIG. 3 a block diagram of an application message.

Referring to FIG. 3, which illustrates an exemplary application message 300. The application message 300 can be created in a variety of ways. A user of the communications platform 100 such as, but not limited to, an operator, a subscriber, a marketing and/or promotions team can create such a VoiceXML application by using any tool or industry editor or composer. A user can send the application or artifacts of the application as a message to a subscriber. Frequently, an application message includes scripts and data. For example, the illustrated application message 300 is a VoiceXML application for voice subscribers. The application message 300 includes VoiceXML/ECMAScript documents 302, JSP's 304, prompts 306, and data files 308. Frequently, the data files 308 include grammar files, and the data files are normally provided as encoded binary data. Similarly, the prompts 306 may also be provided in encoded binary format and prompts include audio and/or video prompts.

Resources that support the application may be either included in the message 300 or accessed by defining a URL of the resource in the VoiceXML document. If JSP's are sent they normally use standard tags or available JSP Custom Tags that are supported on the communications platform 100.

Alternatively, an operator can deposit the application message 300 by deploying the artifacts of an application such as prompts directly to the specific components of the communication platform such as Media Servers 120. This allows the operator to leverage performance and storage benefits of locally stored media files, reduce resources on the CDMS 150 and also to control the type of files deployed on the servers in the communications platform 100.

Furthermore, the application message 300 can be sent to the CDMS 150 via SMTP or using a protocol such as, but not limited to, peer-to-peer or other peer-to-peer protocols such as, but not limited to, Glenayre PtP protocol. The application message 300 is deposited in the CDMS 150 as a MIME structure. Email messages with attachments are sent over the Internet using Simple Mail Transfer Protocol (SMTP) and MIME. SMTP is limited to 7-bit ASCII text with a maximum line length of 1000 characters that results in the inability to send attachments. MIME addresses these limitations by specifying message header fields and allowing different related objects such as attachments to be included in the message body in the form of a MIME multipart. For example, if the message body contains multiple independent objects of possibly different data types, the message body is divided into parts by boundaries. To indicate that the message body comprises a multipart structure of independent attachments, a Content-Type message header field is set. Thus, multiple files can be stored in a message.

Figure 4:
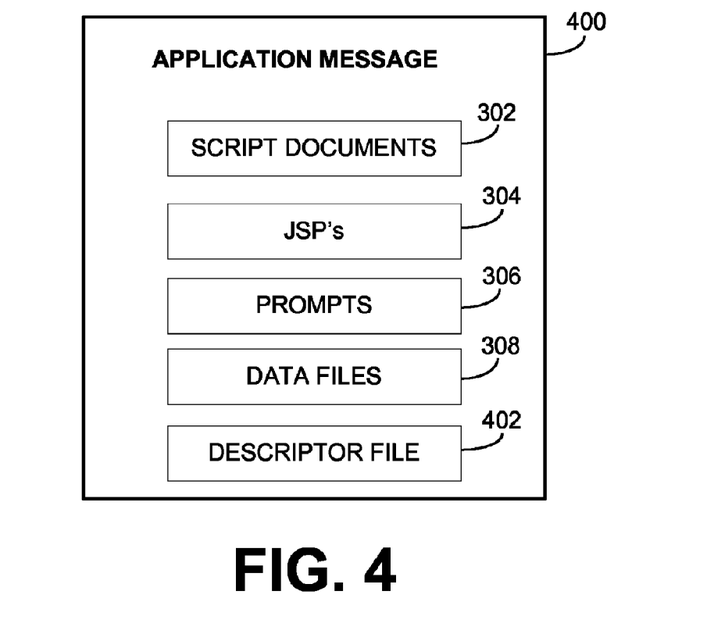
FIG. 4 is a block diagram of another embodiment of an application message.

FIG. 4 illustrates another exemplary embodiment of an application message 400. The application message 400 includes the artifacts of the application message 300 and optional artifacts. Optional artifacts include an XML deployment descriptor file 402, which is included in the application message 400 with the other application message artifacts, i.e., the VoiceXML/ECMAScript documents 302, JSP's 304, prompts 306, and data files 308. Including optional artifacts such as the XML deployment descriptor file 402 allows the application to provide application message metadata such as to decide which of the application message scripts to execute based on the type of call (voice, video) or device (SIP client, 3G-324M device) or any authentication credentials for external applications such as rating engine or content sources or if a message should be automatically deleted after it is accessed. In some embodiments, the deployment descriptor file 402 may be signed to ensure the authenticity and integrity of the application artifacts.

Storage of Application Message

In one embodiment, the application message 300 comprising the VoiceXML/ECMAScript documents 302, JSP's 304, prompts 306, and data files 308 is stored as a message with binary contents in a subscriber's mailbox 152. The application message 154 has a flag associated with it. The flag can be used to mark a stored message as an application message. The flag allows for more expediency in detecting the message type.

In one embodiment, the communication platform 100 provides a web-based GUI that operators can use to deposit an application message and its artifacts. The application message may be deposited in subscribers' mailboxes. The GUI provides a wizard to simplify this process of depositing application messages by allowing operators to select subscribers, groups of subscribers, and classes of service. The GUI enables the upload of scripts including VXML scripts, audio and video prompts and any other application artifacts to a defined group of mailboxes.

The GUI also enables operators to reference artifacts of the application such as scripts and prompts that have been deployed directly to the components of the communication platform 100 such as Media Servers 120. This allows the operator to leverage performance and storage benefits of locally stored media files, reduce resources on the message store and control the type of files deployed on the servers in the network.

The application message (which many include VoiceXML application artifacts) may then be deposited and stored in the message store as a MIME structure. A message notification can be provided as a result of the application message deposit.

Retrieval of Application Message

When a subscriber selects to access an application message 154 stored in the subscriber's mailbox, the back end 144, which may include a messaging system such as OpenUMS, identifies the selected message as an application message. The application message may then be retrieved as a binary object (BLOB) from the CDMS 150. Once the BLOB is retrieved, the application message is then MIME decoded and the artifacts of the application which include the application's documents and supporting resources are temporarily deployed on the Application Server 140. In some embodiments, a VoiceXML document from an application message can also reference supporting media files on remote hosts as defined in the VoiceXML specification. The back end 144 then presents the artifacts/files that comprise the application message to the front end 142. The front end 142 typically includes a TUI application, which then renders the application message into an application that is normally embodied in a VXML page.

The VoiceXML page(s) of the application message can then be validated. For example, the front end 142 may include a validation engine (not shown), and the validation engine may be used to ensure the application is a valid VoiceXML application, which does not comprise code that could pose security risks or impose excessive resource consumption demands, intentionally or unintentionally, on the server it is running on. The validation engine could provide a knowledge base with an XML rule-based format to detect such anomalies. If the application message documents are valid, then they can be modified by the TUI application or a supporting component in order to ensure secure and seamless application integration with the application currently being executed. For example, the new VoiceXML documents can be modified to reference the existing root document of the application currently being executed and session variables could be updated. The J2EE container then executes the new document and then returns the newly created VoiceXML page to the Media Server so that it can be executed. For the Media Server, this is simply another VoiceXML document returned by the Application Server to support the current subscriber's session. After the application executes, post-application routines are invoked (email confirmations can be sent or data collection routines), and the TUI returns the next TUI VoiceXML page to the Media Server.

Once the session is completed, the application artifacts associated with the application message are cleaned up.

Operator-Control

In one embodiment, the operator of the communication platform 100 may create an application by deploying a deployment descriptor that describes the application resources that are deployed on communication platform servers such as the Media Server and Application Server. Typically, a signed document, which may be signed by a protocol such as, but not limited to, PKI, is deposited in the CDMS. The signed document describes the locations of supporting application documents as well as some personalized files. The signed document and any files are still stored as a BLOB and retrieved by the OpenUMS and MIME decoded. In this case, the TUI includes a validation engine that ensures that the PKI signed document is valid before accessing the message. In addition, the application message might have a pointer to a VoiceXML document, which may already be deployed on a server of the communication platform 100 and which may be validated by the validation engine. When the VoiceXML document is already deployed on a server, MIME decoding the content of the application message may not be required. The subscribers may continue to receive a message in their mailbox and access that message resulting in a personalized application being executed.

Among others, advantages of this design approach include:
Allowing the operator to control the deployment of application messages. Only application messages with signed descriptors can be executed. Thus issues concerning security (spam, virus control) and resource usage (denial of service attacks) of the communication platform are mitigated.
Improving system performance because it is possible that a large number of files and supporting application documents do not need to be MIME decoded and deployed in real-time and consume system resources. Further, the Media Servers do not need to access prompts deployed on separate servers.
Preventing subscribers and users in general from creating applications that can hinder other deployed operator services such as unvalidated VoiceXML scripts that perform poorly or erroneously.
Creating rich and personalized and customized video menus to a priori rather than on-demand. Rather than incur the performance overhead and limitations of creating video menus dynamically when the subscriber logs in, a richer interface can be created before hand by the operator and deposited in a subscriber's mailbox. This is in contrast to incurring the performance overhead and technology limitations of creating dynamic video menus on the fly.

Architectural Use Cases

Presented hereinbelow are non-limiting examples illustrating various uses and functions of illustrative embodiments of the invention.

Case 1: Operator creates application message

An application message may include an application that is a customer service survey based on a call made by the subscriber to the operator's customer service department. The voice application asks the subscriber to use DTMF keys to rate satisfaction with the subscriber's recent customer service experience.

The operator creates the VoiceXML document and prompts and sends it to the subscriber's mailbox. In some embodiments, a GUI client may be used to send the documents and prompt files as MIME-encoded attachments to the subscriber's mailbox. Alternatively, the prompts could be deployed to the Media Servers and referenced by the VoiceXML document. Upon receipt of the message, the CDMS delivers a message waiting notification to the subscriber.

Case 2: Subscriber creates application message

A susbcriber creates an application message for another subscriber. The message represents an application for "knock knock jokes". The speech-enabled voice application tells the other subscriber the "knock knock" jokes.

The operator creates the VoiceXML document and prompts and sends it to the subscriber's mailbox. An SMTP-compliant email client could be used to send the documents and prompt files as MIME-encoded attachments to the subscriber's mailbox. Alternatively, the prompts could be deployed to the Media Servers and referenced by the VoiceXML document. Upon receipt of the message, the CDMS delivers a message waiting notification to the subscriber.

Case 3: Subscriber accesses application message

Based on a message waiting notification to the subscriber, the subscriber calls in to retrieve his/her messages, the subscriber is authenticated and then a message summary/menu menu page is returned to the Media Server to be played to the subscriber. There will be, at least, the one new message.

When the subscriber selects to listen to the message, a request is made to the Application Server for the next VoiceXML page to be interpreted by the Media Server. The voice mail/video mail application requests the message contents from OpenUMS. OpenUMS will recognize that this is an application message and retrieve a BLOB from the message store and then decode the binary object into attachments. The attachments (VoiceXML documents, prompts) are then temporarily deployed on the Application Server and their references are returned as attachments of the message. The voice mail/video mail application modifies the VoiceXML document to ensure that it functions appropriately—to ensure that it references the current root document, referencing the location of the prompts and adds a reference to return to the access of the next message. The application then returns the resulting VoiceXML document as the VoiceXML page to be executed next.

The Media Server executes the returned VoiceXML page. The Media Server references any prompts stored on the Application Server in a directory. The subscriber presses one of the DTMF keys and listens to a closing prompt. The selected key press is captured and counters are incremented. The captured data is sent to a URL referenced in the document. The Media Server then makes the request for the next VoiceMXL page from the Application Server to listen to the next message.

Case 4: Video Application Message

A subscriber is an avid movie watcher. The subscriber has subscribed to a new movie preview service. With this, the subscriber receives a message in the subscriber's mailbox. When the subscriber accesses the message with a videophone, the subscriber is given a chance to view trailers from newly released movies. The subscriber is given the option to purchase these movies on DVD and have them shipped to the subscriber's home address.

Figure 5:
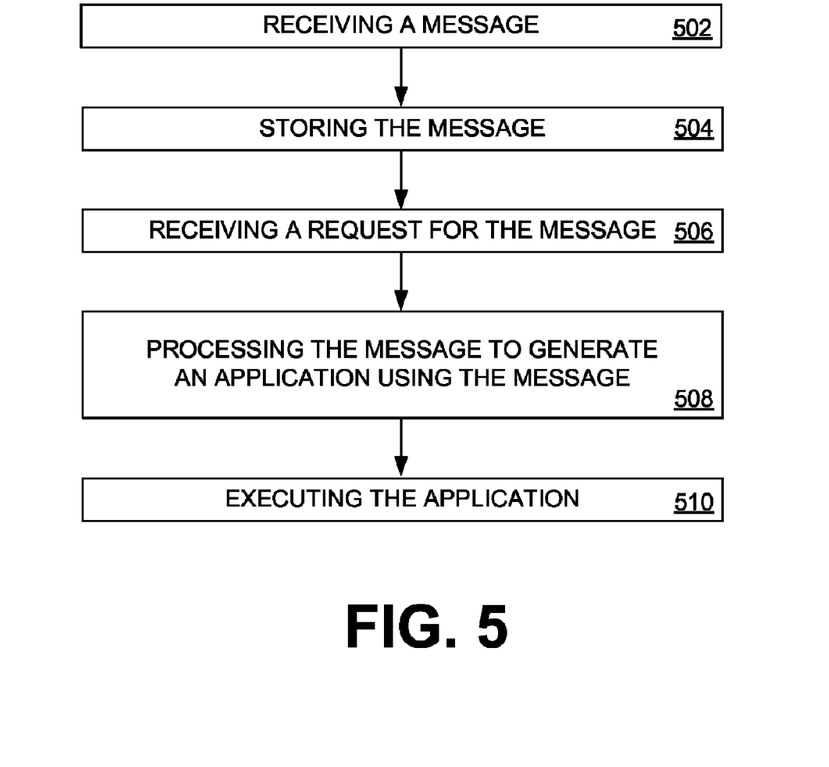
FIG. 5 is a flow chart of steps implemented at the communication platform.

Referring to FIG. 5, which illustrates exemplary steps that may be performed at the communication platform 100, in step 502, an application message is received at the communication platform. It should be remembered that in some embodiments, the operator of the communication platform may generate an application. Thus, in some situations, the application message may be created at the communication platform instead of being received there.

In step 504, the message, which may be for a single subscriber or for multiple subscribers of the communication platform, is stored in the mailbox of the subscriber (or in the mailboxes of the subscribers.)

In step 506, the communication platform receives a request for the message. It should be remembered that the communication platform may be configured to, in response to receiving a message for a subscriber, alert the subscriber that a message has been received. The subscriber may access the communication platform whenever he or she so desires or may access the communication platform in response to having received the alert. Upon accessing the communication platform, the subscriber sends a request for the received message. It should be remembered that the application message appears to the subscriber as a typical message.

In step 508, the communication platform processes the message, or a portion of the message, to generate an application. Processing of the message may include validating the message, decoding the message, MIME decoding the message, determining whether the application is valid, generating a first application and then modifying the application.

In step 510, the application is executed and content is then provided to the subscriber. It should be remembered that the content may be in the form of audio content and/or may also be in the form of video content and/or may be in the form of audio/video content.

It should be emphasized that the above-described embodiments of the present invention, particularly, any "preferred" or "exemplary" embodiments, are merely possible examples of implementations, merely set forth for a clear understanding of the principles of the invention. Many variations and modifications may be made to the above-described embodiment(s) of the invention without departing substantially from the spirit and principles of the invention. It should also be appreciated that any particular embodiment may include only some of the various aspects of the present invention. All such modifications and variations are intended to be included herein within the scope of this disclosure and the present invention and protected by the following claims.

What is claimed is:

1. A method of providing service to a user of a telecommunications platform, the method comprising the steps of:
receiving a signed message at the telecommunications platform, the signed message being directed to a particular user of the telecommunications platform and comprising the following components:

media content;
an identifier for one or more supporting elements that are resident on the telecommunications platform, wherein the supporting elements are separate from the received signed message; and
an XML (eXtensible Markup Language) deployment descriptor file;
storing, by the telecommunications platform, the signed message into a signed message storage system in a mailbox associated with the particular user;
upon an action taken by the particular user via a user device in communication with the telecommunications platform, the telecommunications platform retrieving the signed message from the signed message storage system;
authenticating, by the telecommunications platform, the signed message;
generating, by the telecommunications platform, an un-compiled application if the signed message is authenticated, wherein the un-compiled application is constructed from the received signed message components and the one or more separately stored supporting elements; and
providing, by the telecommunications platform, content to the particular user by interpreting and executing the un-compiled application, wherein execution of the interpreted application includes the selection of an application message script based on the type of user device being used by the particular user.

2. The method of claim 1, wherein the signed message is formatted according to an internet protocol.

3. The method of claim 2, wherein the internet protocol includes MIME (Multipurpose Internet Mail Extensions).

4. The method of claim 2, wherein the signed message is stored in the message storage system as a binary object.

5. The method of claim 1, wherein the signed message retrieved from the message storage system is a binary object, and further comprising the step of:

decoding the message using an internet protocol to produce message artifacts.

6. The method of claim 5, wherein the message is MIME (Multipurpose Internet Mail Extensions) decoded.

7. A method of providing service to a user of a telecommunications platform, the method comprising the steps of:
receiving a signed message at the telecommunications platform, the signed message being directed to a particular user and comprising:
an identifier for one or more supporting elements that are resident on the telecommunications platform, wherein the supporting elements are separate from the received signed message; and
an XML (eXtensible Markup Language) deployment descriptor file;
storing the signed message into a message storage system in a mailbox associated with the particular user;
creating personalized video menus;
depositing the personalized video menus as supporting elements in a particular user's mailbox on the telecommunications platform;
upon an action taken by the particular user, retrieving the signed message from the signed message storage system;
validating the signed message;
generating an un-compiled application if the signed message is validated, wherein the un-compiled application is constructed from the received signed message, the personalized video menus, and the one or more separately stored supporting elements such that an application message script may be selected and executed based on the type of device accessing the signed message and wherein the un-compiled application includes a Voice eXtensible Markup Language;
and providing content to the particular user by interpreting and executing the un-compiled application.

* * * * *